8372 X
E. HIDDEN.
Gun-Lock.
Patented Aug 20, 1834.
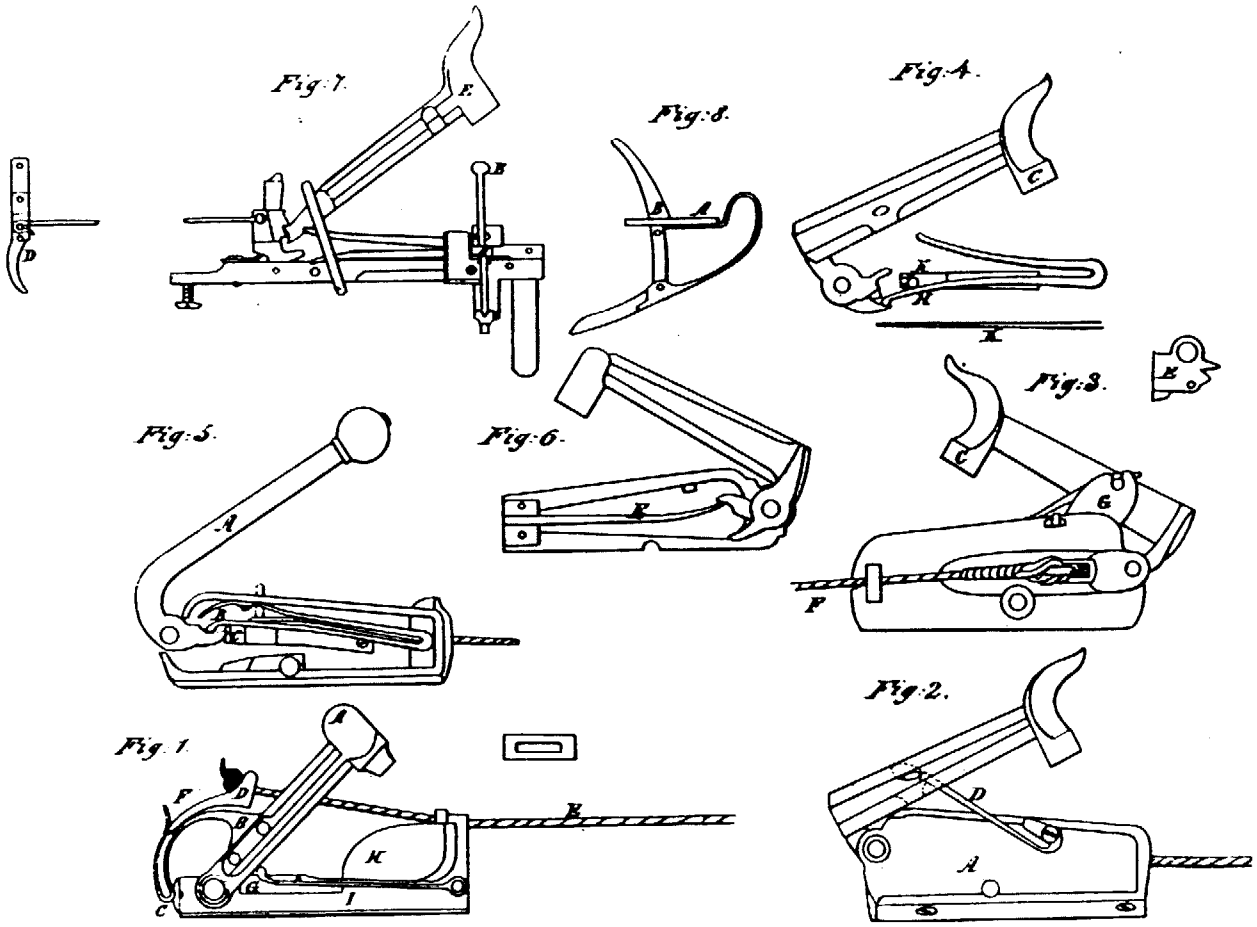
N. PETERS, PHOTO-LITHOGRAPHER, WASHINGTON, D. C.

8372X

UNITED STATES PATENT OFFICE.

ENOCH HIDDEN, OF NEW YORK, N. Y.

IMPROVEMENT IN PERCUSSION-LOCKS FOR FIRING CANNON.

Specification forming part of Letters Patent dated August 20, 1834.

*To all whom it may concern:*

Be it known that I, ENOCH HIDDEN, of the city, county, and State of New York, have invented certain Improvements in the Percussion-Lock for Firing Cannon, by which this instrument is under its various modifications rendered more simple, efficient, and durable than it has heretofore been; and I do hereby declare that the following is a full and exact description thereof, reference being had to the drawings which accompany and make a part of this specification.

The principal object in view in this lock is to cause the hammer to rise with such rapidity after its stroke upon the percussion-cap that it shall be removed out of the way of the blast from the vent before it can be acted upon by the blast. The principle upon which I proceed in attaining this end will be manifest from the exemplifications which are herewith given.

Figure 1 represents the lock without the mainspring, the blow of the hammer being produced by the sudden jerking of the line or cord which acts upon it.

A is the hammer, working upon a joint-pin, and having on it a tail-piece, B, the end of which is lengthened out so as to form a spring, which bears upon the end of the lock-plate at *c*, where, by its friction, it will hold the hammer in its place when it is elevated or cocked. This spring is doubled back or recurved in the manner shown in the drawings.

D is a piece of steel to which the cord E is attached, by which the hammer is to be drawn down. This piece of steel has a mortise or hole through it to admit a pin or catch, F, on the tail-piece B to pass through it. This pin or catch stands in such a position as to retain the piece D until it is drawn forward so far by the cord E as to cause the hammer to strike the cap, when it slips off and leaves the hammer at liberty to rise.

G is a reacting-spring, which lifts the hammer instantaneously after the stroke. H is a guard-plate to prevent the cord from being affected by the fire. The plate I is to be attached to the cannon by screws or in any other convenient mode.

Figs. 2, 3, and 4 represent another modification of this lock, in which the hammer is forced down by a mainspring, the mainspring, when it is cocked, being held up by a catch, which is liberated by the jerking of a cord, as in that first described. The mainspring and the reacting-spring are in this lock inclosed in a box or case.

A is a movable plate which may be taken off by unscrewing the screw B, which is the joint-pin of the hammer *c*. D is a spring having a notch on its upper end, which catches upon a pin on the hammer and holds it in the position shown when it is thrown up by the reacting-spring.

Fig. 3 is the opposite side of the lock, on which is shown the outer end of the catch or latch E, which holds up the mainspring, and to which the cord F is attached. G is a plate or projecting piece on the case to receive a pin on the spring D and retain it in its place.

Fig. 4 exhibits the arrangement of the main and reacting springs within the case. H is the mainspring bearing on the tail of the hammer and forcing it down. I is the catch or latch which holds it up when cocked, and K is the reacting-spring which throws it up after the stroke. This spring I usually attach to the inner side of the plate A, Fig. 2.

The mainspring is made of such strength as to give the hammer sufficient impulse to throw it two or three inches beyond the immediate action of the spring, and, being acted upon by the reacting-spring at the moment of striking the percussion-cap, is thrown up against the mainspring, where it is held by the spring-catch, as before mentioned, the pin or projection on the hammer being caught in the notch on the end of the spring-catch at the instant of rising, and thus preventing any rebounding motion of the hammer over the vent. This lock requires but one movement to cock it, which is performed by the hammer itself without the assistance of a lever and second movement, as in the lock described in the third modification or French percussion-lock following.

Figs. 5 and 6 show another modification of this lock, in which my mode of applying the reacting-spring is applied to the French percussion-lock and the lever by which it is cocked is improved. A is the lever, which, when the lock is not cocked, lies close down upon the box or case. In the position in which it is shown it has lifted the mainspring so as to rest upon the latch or catch c, upon which the cord D acts, as in the lock last described.

Fig. 6 shows the interior of the movable plate with the reacting-spring E, which is also placed and operates in the same way with that in the last-described modification.

Figs. 7 and 8 exhibit the manner in which I apply the reacting-spring to a portable percussion cannon-lock. This lock I need not describe, as I do not claim it as my invention, but claim the mode only of applying the spring to produce the same effect as in the fixed lock.

The same letters in each figure represent like parts.

The plate A serves to attach the apparatus to the top of the portable instrument, and it has a slot on its projecting end, through which the latch or catch B passes and holds up the spring C, which, when the cannon is to be fired, rests upon it. When, by pulling the trigger D, the hammer E falls a projecting pin, F, disengages the catch B, and the reacting-spring C throws up the lock out of the way of the vent.

What I claim as my invention, and for which I ask a Patent, is—

1. The manner in which I employ the reacting-spring, as described, under the various modifications thereof, as herein shown, by which the hammer is instantaneously thrown up after striking the percussion-cap directly upon the vent of a cannon.

2. The manner of applying the cocking-lever under an arrangement by which it is made to lie close to the case or box of the lock.

3. The spring-catch and the manner of working the trigger, and particularly the arrangement of the parts described in the second modification, by which the operation and effect therein mentioned are produced.

4. The reacting-spring as applied to the hand-lock, by which the lock is entirely removed from the vent at the instant of igniting the powder in any manner whatever.

ENOCH HIDDEN.

Witnesses:
ROBT. CLARKE,
RICHD. HENDLEY.